(12) United States Patent
Bruce et al.

(10) Patent No.: US 9,545,046 B1
(45) Date of Patent: Jan. 17, 2017

(54) AGRICULTURAL DRILL/PLANTER/COULTER/DISC BLADE WITH RIBS FOR STRENGTH

(71) Applicant: Osmundson Mfg. Co., Perry, IA (US)

(72) Inventors: Douglas G. Bruce, West Des Moines, IA (US); James T. Tibbles, Panora, IA (US)

(73) Assignee: OSMUNDSON MFG CO, Perry, IA (US)

( * ) Notice: Subject to any disclaimer, the term of this patent is extended or adjusted under 35 U.S.C. 154(b) by 0 days.

(21) Appl. No.: 14/805,658

(22) Filed: Jul. 22, 2015

(51) Int. Cl.
*A01B 15/18* (2006.01)
*A01B 15/16* (2006.01)
*A01B 5/00* (2006.01)
*A01C 5/06* (2006.01)

(52) U.S. Cl.
CPC ............. *A01B 15/16* (2013.01); *A01B 5/00* (2013.01); *A01B 15/18* (2013.01); *A01C 5/064* (2013.01)

(58) Field of Classification Search
CPC ......... A01B 15/16; A01B 15/18; A01B 21/08; A01B 23/06; A01B 5/00; A01C 5/064
USPC ... 111/164, 167, 169, 170, 189, 195; 172/555, 604, 765
See application file for complete search history.

(56) References Cited

U.S. PATENT DOCUMENTS

| 323,344 A | * | 7/1885 | Dow | A01B 21/08 |
| | | | | 172/579 |
| 672,536 A | | 4/1901 | Newton | |
| 1,663,239 A | | 3/1928 | Bucknam | |
| 2,291,722 A | | 8/1942 | Ingersoll | |
| 2,908,338 A | * | 10/1959 | Hanrahan | A01B 15/18 |
| | | | | 172/166 |
| 3,559,748 A | * | 2/1971 | Shelton | A01B 15/18 |
| | | | | 172/604 |
| 4,072,197 A | | 2/1978 | Boyd-Dunlop | |
| D260,264 S | | 8/1981 | Carlsson et al. | |
| 4,420,048 A | * | 12/1983 | Peterson | A01B 23/06 |
| | | | | 172/568 |
| 4,538,688 A | * | 9/1985 | Szucs | A01B 15/16 |
| | | | | 172/555 |
| 5,649,602 A | | 7/1997 | Bruce | |
| 5,782,307 A | * | 7/1998 | Forsyth | A01C 23/025 |
| | | | | 172/156 |
| 5,816,340 A | * | 10/1998 | Cox | A01B 35/18 |
| | | | | 172/508 |
| 6,378,622 B1 | * | 4/2002 | Kostrun | A01B 71/04 |
| | | | | 172/604 |
| D467,944 S | | 12/2002 | Stark | |

(Continued)

FOREIGN PATENT DOCUMENTS

GB          832431          4/1960

*Primary Examiner* — Robert Pezzuto
(74) *Attorney, Agent, or Firm* — Sturm & Fix LLP (57) ABSTRACT

A ground engaging agricultural tillage blade having a central opening adapted to be attached to an implement for rotation about a substantially horizontal axis of rotation; the blade having an outer periphery; and reinforcing flutes disposed in the plate from a location substantially at the outer periphery to a location adjacent the central opening. The blade can be used with a hub disposed around the central opening, a hub that covers at least a portion of the flutes or a spacer on a shaft extending through the central openings of adjacent blades, the spacers extending radially outwardly by a distance sufficient to place a portion of the spacer in abutment with at least a portion of the flutes.

25 Claims, 8 Drawing Sheets

(56) References Cited

U.S. PATENT DOCUMENTS

| | | |
|---|---|---|
| D469,447 S | 1/2003 | Stark |
| 6,554,079 B2 | 4/2003 | Bruce |
| 7,143,704 B1 | 12/2006 | Gust et al. |
| 7,448,333 B2 * | 11/2008 | Kinkead ................ A01C 5/064 111/164 |
| 7,874,376 B2 * | 1/2011 | Piccat .................... A01B 23/06 172/604 |
| D693,377 S | 11/2013 | Bruce |
| D694,286 S | 11/2013 | Bruce |
| 2011/0073332 A1 | 3/2011 | Ward |
| 2011/0240319 A1 * | 10/2011 | Sanderson ............. A01B 23/06 172/604 |

* cited by examiner

AGRICULTURAL DRILL/PLANTER/COULTER/DISC BLADE WITH RIBS FOR STRENGTH

TECHNICAL FIELD

This invention relates generally to an improved ground engaging blade for an agricultural implement such as a tillage disc or coulter, drill or planter, and more particularly to such a blade that, due to its shape, is stronger than prior art blades of the same type.

BACKGROUND

Fluted coulters or discs, for example as shown in U.S. Pat. No. 4,538,688 to Szucs et al., has an outer peripheral cutting surface and flutes 17/27/37/51/61/81 that extend radially outwardly from a respective center flat portion 14/24/34/44/54/64/74/84 that has a respective central opening 15/25/3545/55/65/75/85. From the point of view of strength of the Szucs et al. blades, anywhere that the metal of the disc/coulter has been changed from being flat as it started out from in the manufacturing process, is going to be weaker than that part of the blade that has not been changed from flat. And that portion of the blade where any abrupt change from flat occurs is going to be the weakest part of the blade and consequently the most likely place for the blade to break if subjected to extreme forces such as when the blade hits a large rock in a farm field during use.

Simpler blades like that shown in U.S. Pat. No. 1,663,239 to Bucknam, U.S. Pat. No. 2,291,722 to Ingersoll and British Patent Specification No. 832,431 to Gheraldo have circular bends on radially inner diameters compared, for example, to a simple convex/concave disc of the well known common type shown in U.S. Pat. No. 4,072,197 to Boyd-Dunlop.

So if the discs shown in U.S. Pat. No. 1,663,239 to Bucknam, U.S. Pat. No. 2,291,722 to Ingersoll and British Patent Specification No. 832,431 to Gheraldo hit a large rock in the field and break, the break will of course be at the weakest place on the disc which is at the circular area where the sharpest bends of the respective discs are located. When such a disc hits a rock, the greatest moment arm (thereby causing the greatest breaking forces) will be from where the disc hit the rock on the outside periphery of the disc to the radially innermost weakest part of the disc where the flat plate abruptly changes from flat to some other shape. This weakest part is radially outwardly from the center of rotation of the disc to the most radially inward place where one of the abrupt bend of the plate/disc occurs, such as at 16 of Buckman, 18 of Ingersoll and 18 or 11 of Gheraldo or the radially innermost place on the Szucs et al. coulters where the flat part of the coulter is bent, for example.

If the simple convex/concave disc of the well known common type that has been used for over a century like that shown in U.S. Pat. No. 4,072,197 to Boyd-Dunlop hits a big rock hard enough, it will break, but it is not predictable where the break will occur in the blade because the curvature is constant throughout the entire blade except for the sharpened portion on the extreme outer periphery thereof.

All of the aforementioned prior art documents are incorporated herein by reference in their entirety.

Accordingly, there is a need for a disc, coulter or planter blade that is stronger than those available in the past due simply to the configuration thereof.

SUMMARY OF THE INVENTION

The present invention relates to an improved agricultural disc, coulter, planter/drill blade that is stronger than those available in the past due simply to the configuration thereof by using radial ribs that extend farther radially inwardly than prior art discs and coulters.

BRIEF DESCRIPTION OF THE DRAWINGS

The above needs are at least partially met through provision of the apparatus described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 13:
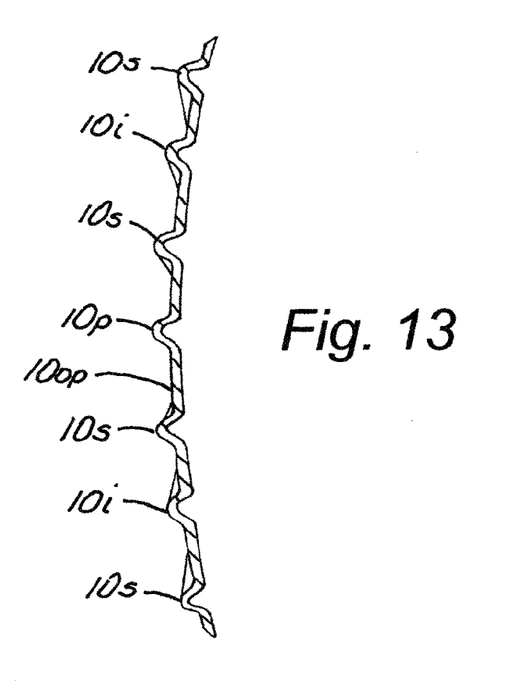
FIG. 13 is a cross sectional view taken along line 13-13 of FIG. 3.
Figure 14:
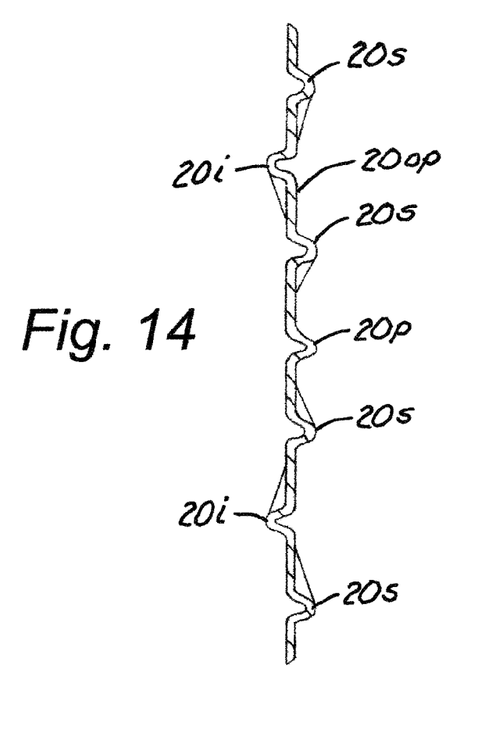
FIG. 14 is a cross sectional view taken along line 14-14 of FIG. 10.

Referring now to FIGS. 1-3 and 13, a disc 10 has long primary flutes 10p, intermediate length flutes 10i centered between the long primary flutes 10p and short flutes 10s between the intermediate length flutes 10i and the long primary flutes 10p. The long primary flutes 10p are shown as being convex on the convex side of the disc 10 shown in FIG. 1, although the reverse of that can be done if desired. The cross section shown in FIG. 13 shows a cross section of the disc 10 and flutes 10p, 10i and 10s.

Figure 5:
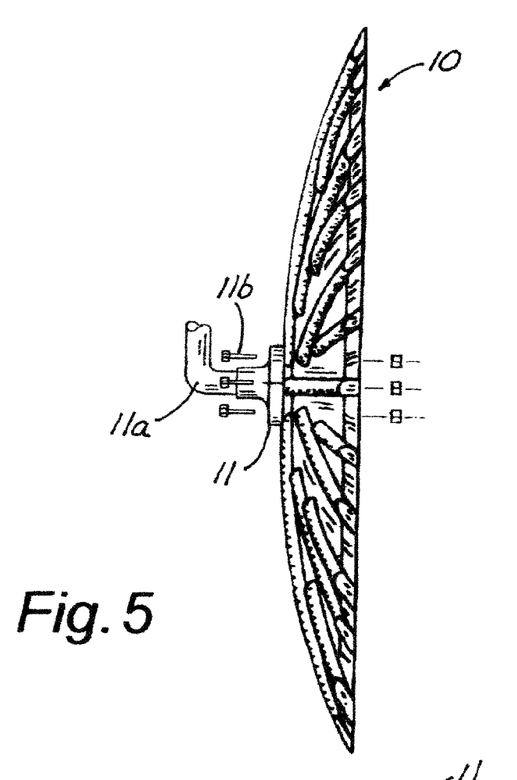
FIG. 5 is a side elevational view of the disc of FIGS. 1-3, but with a hub attached to a bent axle.
Figure 6:
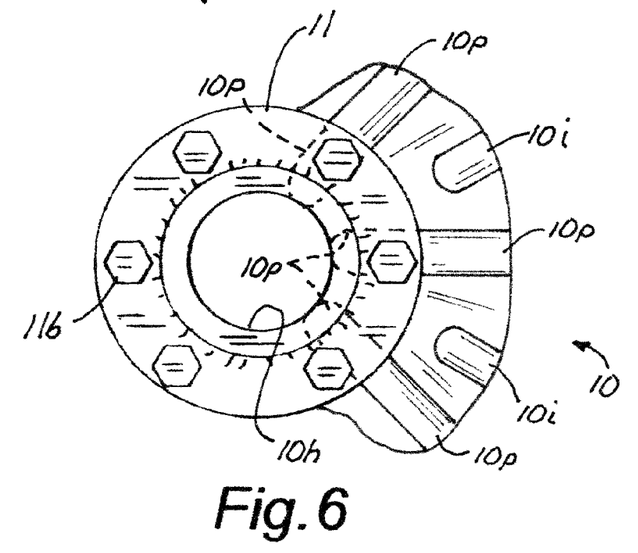
FIG. 6 is an enlarged side elevational view of the hub of FIG. 5 looking from the left side of FIG. 5.

An important distinction between the disc 10 and prior art discs is that the primary flutes 10p extend radially inwardly by a distance close enough to the central opening or hole 10h that any forces applied to the outer periphery 10op, will be transmitted all the way along the flutes to a place under any mounting apparatus such as hub 11 (FIGS. 5-7) on bent axle 11a or spacers 12 (FIGS. 8 and 9) that separate and hold in place the discs 10 along a shaft 13.

Figure 7:
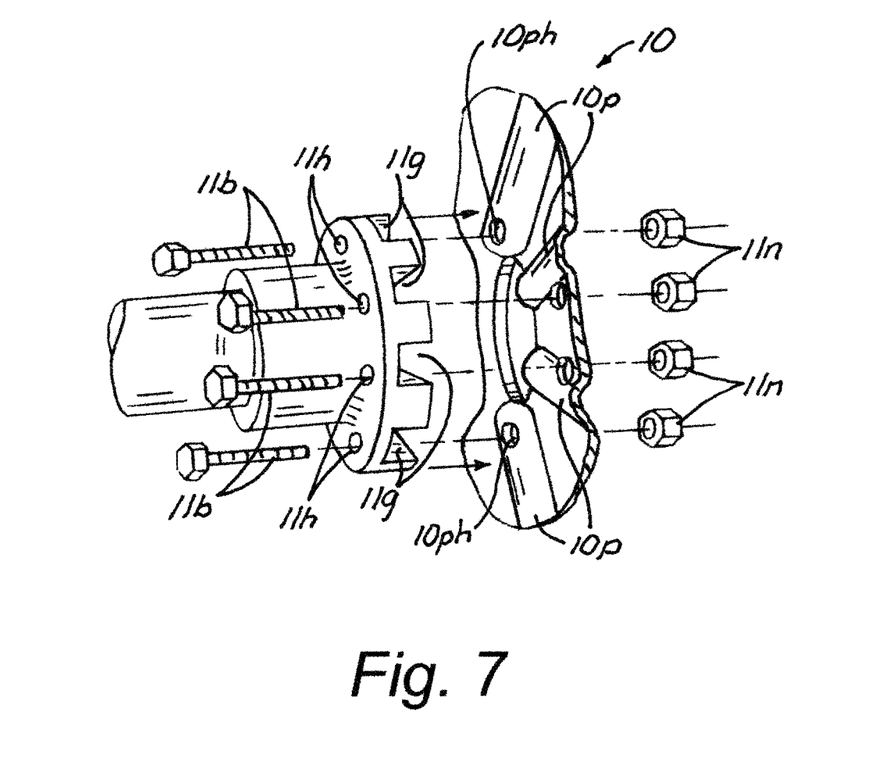
FIG. 7 is an exploded partial perspective view of the disc and hub shown in FIG. 5.
Figure 15:
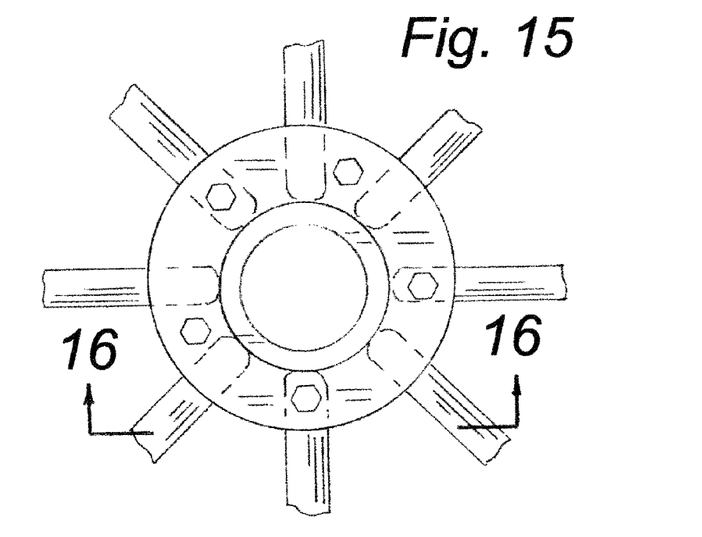
FIG. 15 is a view of the hub looking from the left side of FIG. 7, showing how the primary flutes exend almost to the central opening of the hub.
Figure 16:
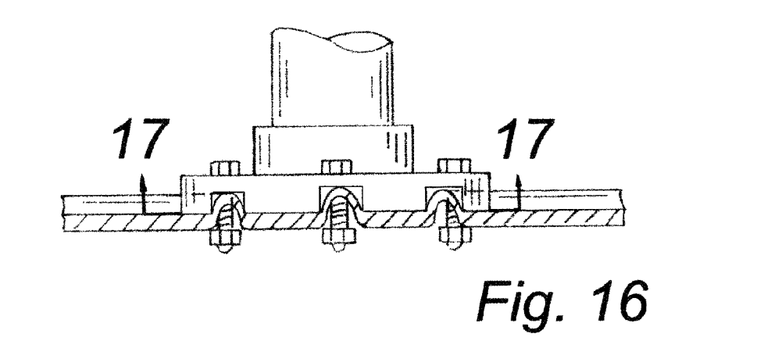
FIG. 16 is a view taken along line 16-16 of FIG. 15 to shown how the primary flutes extend into grooves in the hub.
Figure 17:
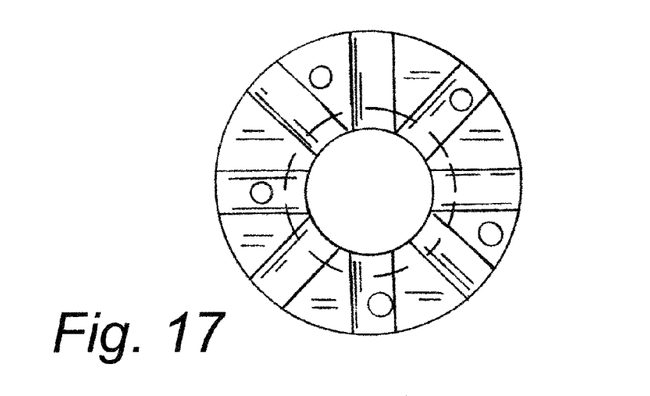
FIG. 17 is a view of that side of the hub that abuts the primary flutes in the disc or coulter, showing complementary grooves for receiving the primary flutes therein.

FIG. 7 shows that the hub 11 is preferably attached to the disc 10 by placing bolts 11b through holes 11h in the hub 11, and through holes 10bh in the disc 10 and through holes 10ph extending through the inner ends of the primary long flutes 10p to make sure that the hub 11 is securely fastened to the disc 10. Nuts 11n are threadably attached to the ends of the bolts 11b to hold the hub 11 to the disc 10. FIGS. 15-17 show that the hub 11 has grooves 11g therein to receive the primary flutes 10p. The hub 11 shown in FIG. 11 is preferably of the same configuration as that shown in FIGS. 7 and 15-17.

Figures 1, 2:
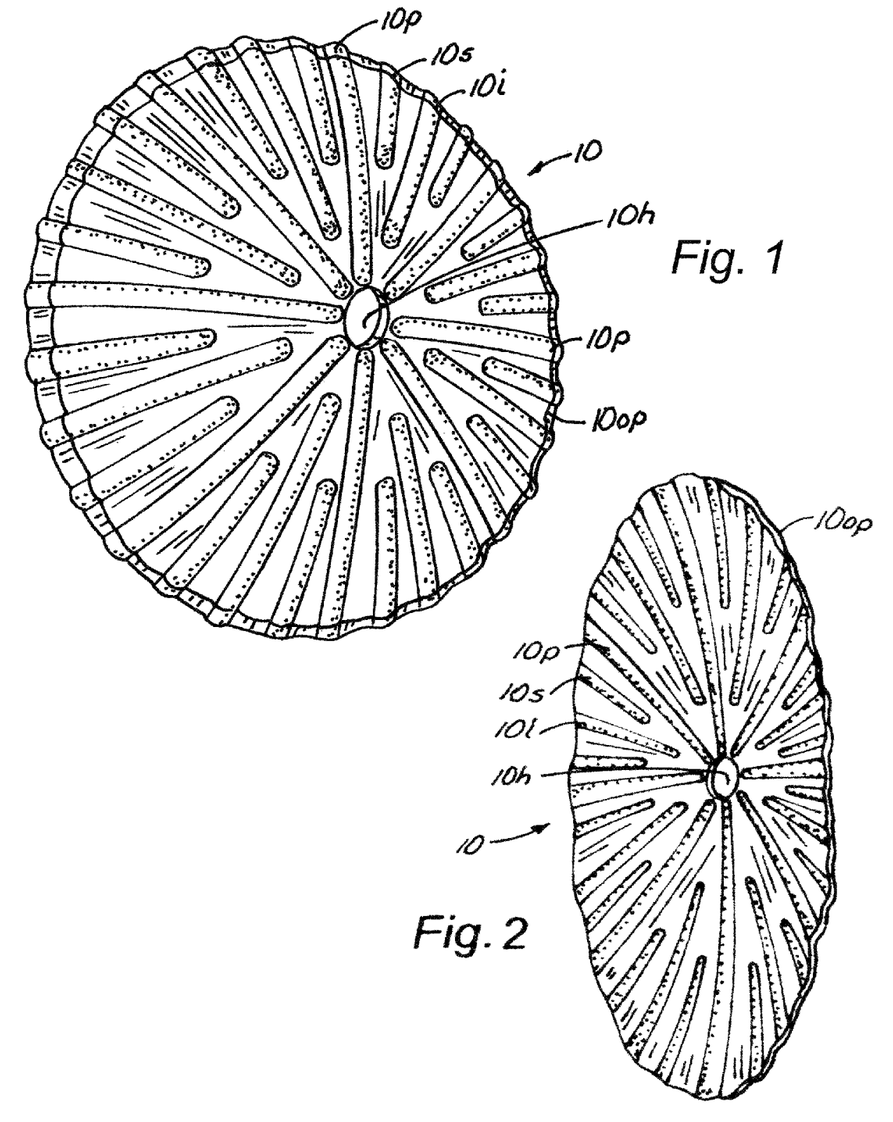
FIG. 1 is a perspective view of the convex side of a concave/convex disc made in accordance with the present invention.
FIG. 2 is a perspective of the concave side of the disc of FIG. 1.
Figure 3:
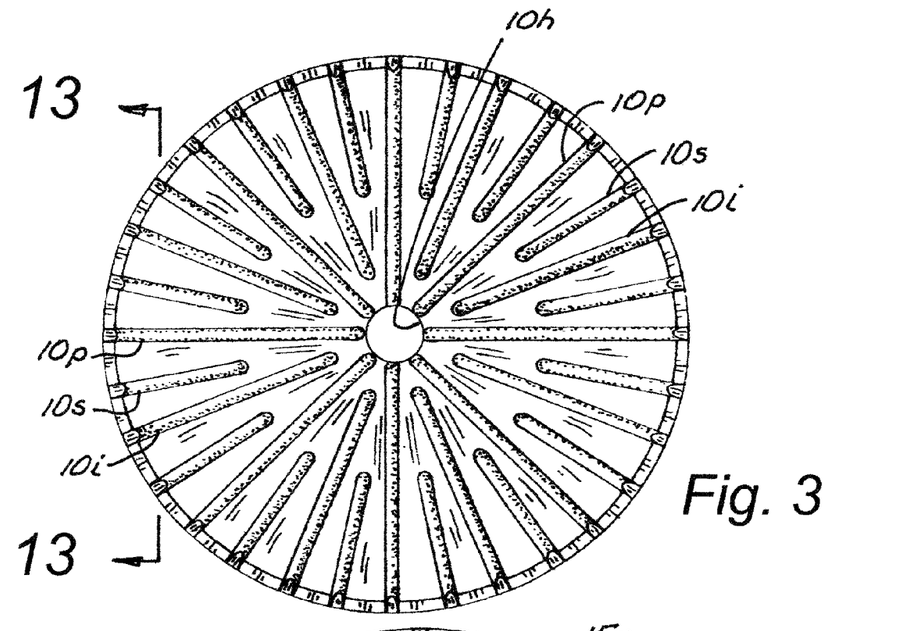
FIG. 3 is a plan view of the convex side of the disc of FIGS. 1 and 2.
Figure 4:
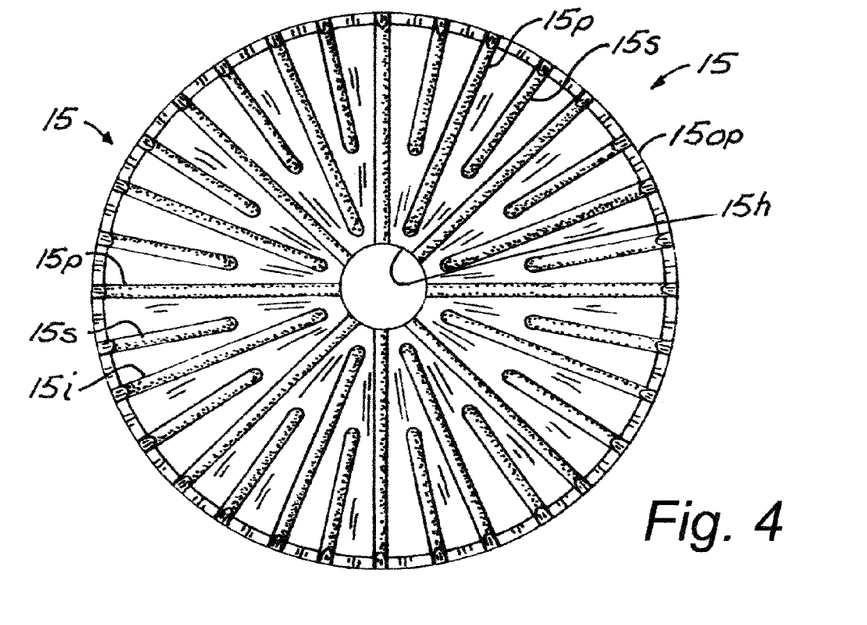
FIG. 4 is a plan view of a concave/convex disc similar to the one shown in FIGS. 1-3, but the center hole has cut off the radially inner ends of the long ribs or primary flutes formed in the disc.

A second embodiment, disc 15, is shown in FIG. 4. The only difference between the disc 15 and the disc 10 of FIGS. 1-3 is that the long primary flutes 15p of the disc 15 are cut off at the hole 15h. Intermediate flutes 15i and short flutes 15s are rounded at the inner ends, the same as the disc 10 in FIGS. 1-3.

Figure 11:
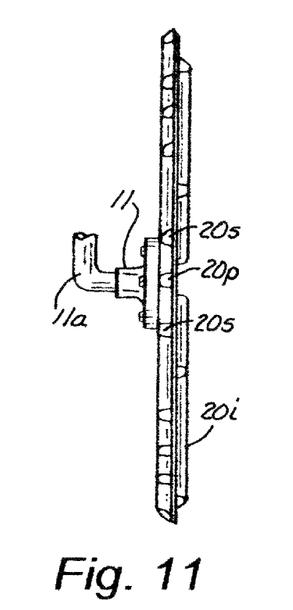
FIG. 11 is a side elevational view of the coulter of FIG. 10 with a hub of the type shown in FIGS. 5-7 attached thereto.

A third embodiment of the present invention, shown by example only, is a coulter 20 shown in FIGS. 10-12 and 14. Long primary flutes 20p go from the outer periphery 20op to the center opening or hole 20h. Intermediate flutes 20i have been chosen optionally to extend out on the other side of the coulter 20 rather than on the same side as the long primary flutes 20p and short flutes 20s. In other words, the convex part of the intermediate flute 20i extends out on the right side of the coulter 20 as shown in FIG. 11, and the concave part of intermediate flute 20i is on the same side of the coulter 20 as the convex part of the long primary flutes 20p and short flutes 20s that extend to the left as shown in FIG. 11. Of course the concave part of the long primary and short flutes 20p and 20s are on the right side as shown in FIG. 11.

It will be understood that in its broadest form the flutes can be concave/convex on any side desired and in any mixed or matched fashion as broadly claimed below. At least some of the flutes need to be long primary flutes 10p, 15p or 20p. It is not required that there be any intermediate or short flutes. This is true for the discs 10 and 15 or coulter 20 shown in FIGS. 1-12, or for any other embodiment having all of the elements of the broadest claims.

Figure 8:
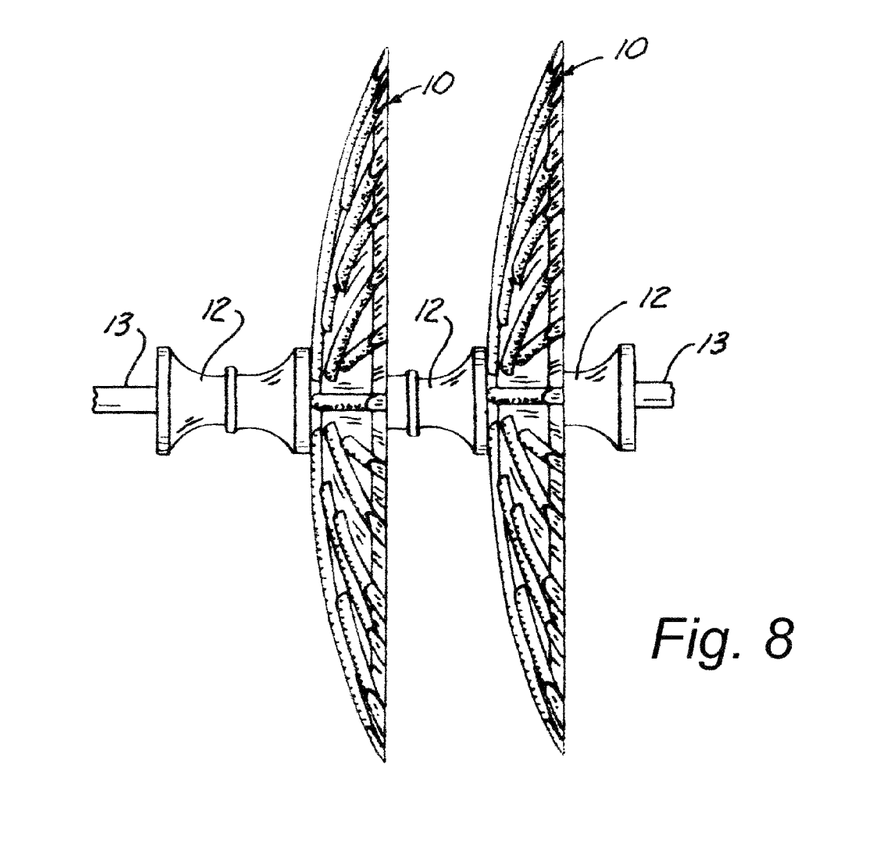
FIG. 8 is a side elevational view of two of the discs of FIGS. 1-3 shown with a spacer between adjacent discs.
Figure 9:
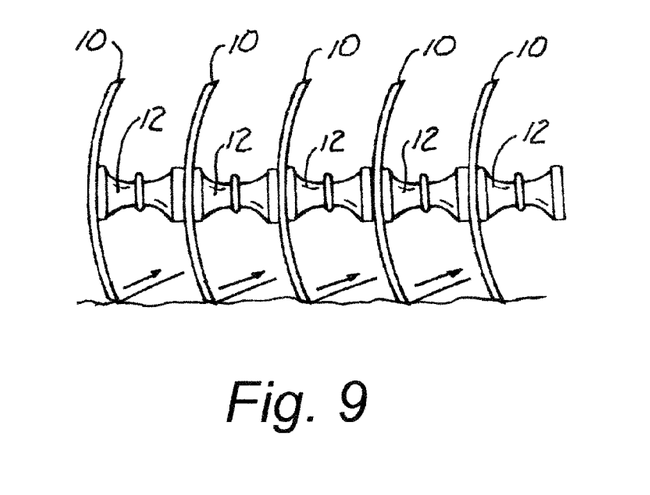
FIG. 9 is a schematic view of part of a gang of discs with spacers between adjacent discs showing the direction that they throw dirt when pulled through an agricultural field.
Figure 10:
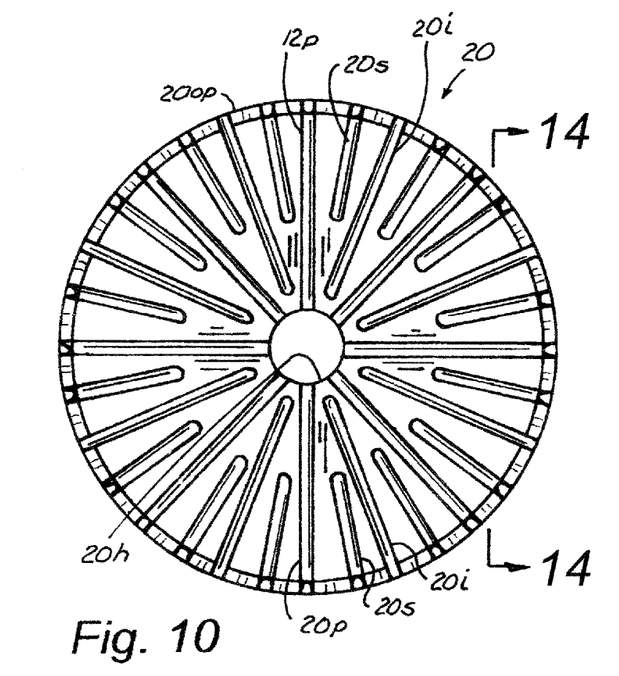
FIG. 10 is a coulter version of the present invention showing long primary flutes and short flutes being convex on one side and concave on the other side and intermediate length flutes having just the opposite concave/convex relationship as the long primary and short flutes.
Figure 12:
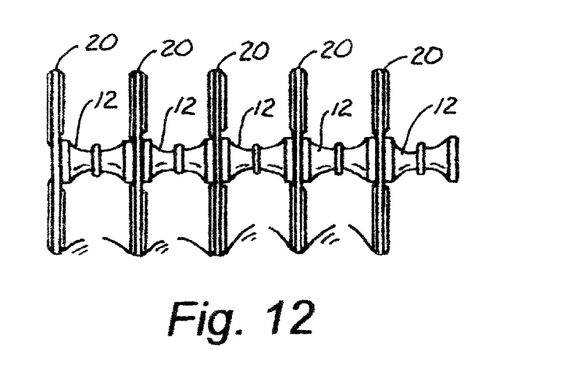
FIG. 12 shows a gang of coulters of the type shown in FIG. 10 disposed on a shaft with spacers disposed between adjacent coulters.

The hubs 12 shown in FIGS. 8, 9 and 12 could have grooves therein like grooves 11g in hub 11, but because the discs 10 and coulters 20 in a preferred embodiment rotate on a round shaft there is no need for grooves (like grooves 11g in the hub) to be in the spacers 12. Of course the disc gang shown in FIG. 9 or the coulter gang shown in FIG. 12 could have a non-circular center opening with a complementary shaped shaft in the non-circular center opening so that the shaft and discs or coulters all rotate together as a unit.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

We claim:

1. A ground engaging agricultural tillage blade comprising:
   a plate having a central opening adapted to be attached to an implement for rotation about an axis of rotation;
   the plate having an outer periphery; and
   reinforcing flutes disposed in the plate from a location substantially at the outer periphery to the central opening.

2. The agricultural tillage blade of claim 1 wherein the reinforcing flutes are substantially straight.

3. The agricultural tillage blade of claim 1 wherein the flutes are substantially uniform in shape throughout the length thereof.

4. The agricultural tillage blade of claim 1 wherein wherein the plate is substantially flat.

5. The agricultural tillage blade of claim 1 wherein the plate has no less than six (6) of the flutes and no more than thirty two (32) of the flutes.

6. The agricultural tillage blade of claim 1 wherein the flutes are concave on one side of the plate and convex on the other side of the plate.

7. The agricultural tillage blade of claim 1 wherein the flutes are primary flutes and there are intermediate flutes disposed between the primary flutes, the intermediate flutes extending from the outer periphery to a place radially outwardly from the central opening.

8. The agricultural tillage blade of claim 7 wherein there are shorter flutes disposed between the primary and intermediate flutes, the shorter flutes extending radially inwardly from the outer periphery but being shorter than the intermediate flutes.

9. The agricultural tillage blade of claim 7 wherein the primary flutes are convex on one side of the plate and the intermediate flutes are convex on the other side of the plate.

10. The agricultural tillage blade of claim 1 wherein the plate is generally convex on one side thereof and concave on another side thereof.

11. The agricultural tillage blade of claim 1 wherein a central hub is attached to the plate, the hub extending over a portion of inner portions of the flutes substantially adjacent the central opening.

12. The agricultural tillage blade of claim 11 wherein substantially aligned holes are disposed through the plate and through the hub and threaded fasteners extend through the aligned holes for holding the hub fixed to the plate.

13. The agricultural tillage blade of claim 12 wherein at least one of the holes in the plate extends through at least one of the flutes.

14. The agricultural tillage blade of claim 13 wherein at least one of the holes in the plate extends through at least one of the parts of the plate which does not comprise a flute.

15. The agricultural tillage blade of claim 12 wherein a spacer is disposed on a shaft between two of the plates and the spacer extends radially outwardly by a distance to cause at least a portion of some of the flutes to be sandwiched between adjacent spacers.

16. A ground engaging agricultural tillage blade apparatus comprising:
   a plate having a central opening adapted to be attached to an implement for rotation about an axis of rotation;
   the plate having an outer periphery;
   reinforcing flutes disposed in the plate from a location substantially at the outer periphery to the central opening; and
   a central hub being attached to the plate, the hub extending over a portion of inner portions of the flutes adjacent the central opening.

17. The agricultural tillage blade of claim 16 wherein substantially aligned holes are disposed through the plate and through the hub and threaded fasteners extend through the aligned holes for holding the hub fixed to the plate.

18. The agricultural tillage blade of claim 17 wherein at least one of the holes in the plate extends through at least one of the flutes.

19. The agricultural tillage blade of claim 18 wherein at least one of the holes in the plate extends through at least one of the parts of the plate which does not comprise a flute.

20. The agricultural tillage blade apparatus of claim 16 wherein the plate is a coulter.

21. The agricultural tillage blade apparatus of claim 16 wherein the plate is a concave/convex disc.

22. The agricultural tillage blade apparatus of claim 16 wherein the hub has grooves therein and at least some of the flutes extend into respective grooves.

23. A ground engaging agricultural tillage blade apparatus comprising:
   at least two plates, each having a central opening adapted to be attached to an implement for rotation about a substantially horizontal axis of rotation;
   each plate having an outer periphery; and
   each plate having reinforcing flutes disposed in the respective plate from a location substantially at the outer periphery to the central opening; and
   wherein a spacer is disposed on a shaft between the at least two plates, the spacer extending radially outwardly from the center hole by a distance sufficient to cause at least a portion of some of the flutes to be disposed radially inwardly of the spacer.

24. The agricultural tillage blade apparatus of claim 23 wherein the plates are coulters.

25. The agricultural tillage blade apparatus of claim 23 wherein the plates are concave/convex discs.

* * * * *